W. B. MOON
TOTAL ADDING WEIGHING SCALE.
APPLICATION FILED MAY 18, 1911.
1,040,380.
Patented Oct. 8, 1912.
4 SHEETS—SHEET 1.
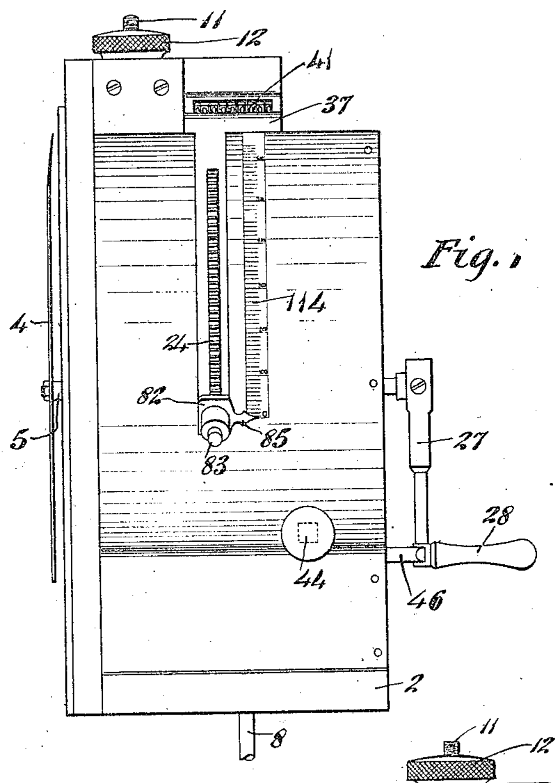
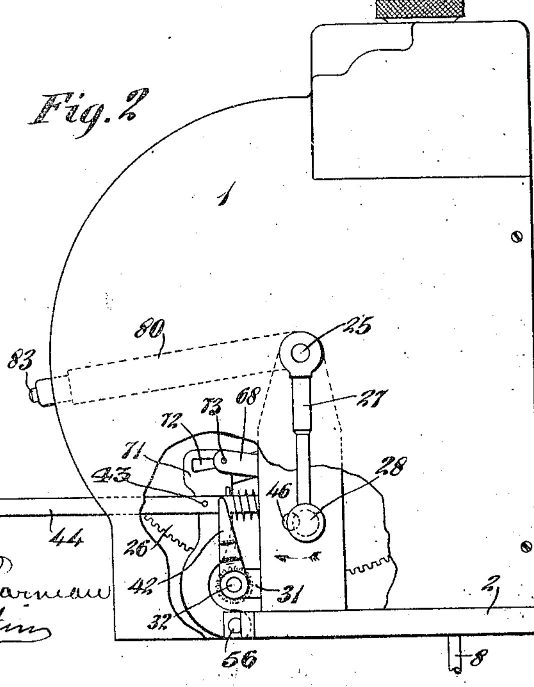
Witnesses
Oliver C. Harman
Earl W. Griffin
Inventor
William B. Moon
by
Alfred M. Allen
Attorney W. B. MOON.
TOTAL ADDING WEIGHING SCALE.
APPLICATION FILED MAY 18, 1911.
1,040,380.
Patented Oct. 8, 1912.
4 SHEETS—SHEET 2.
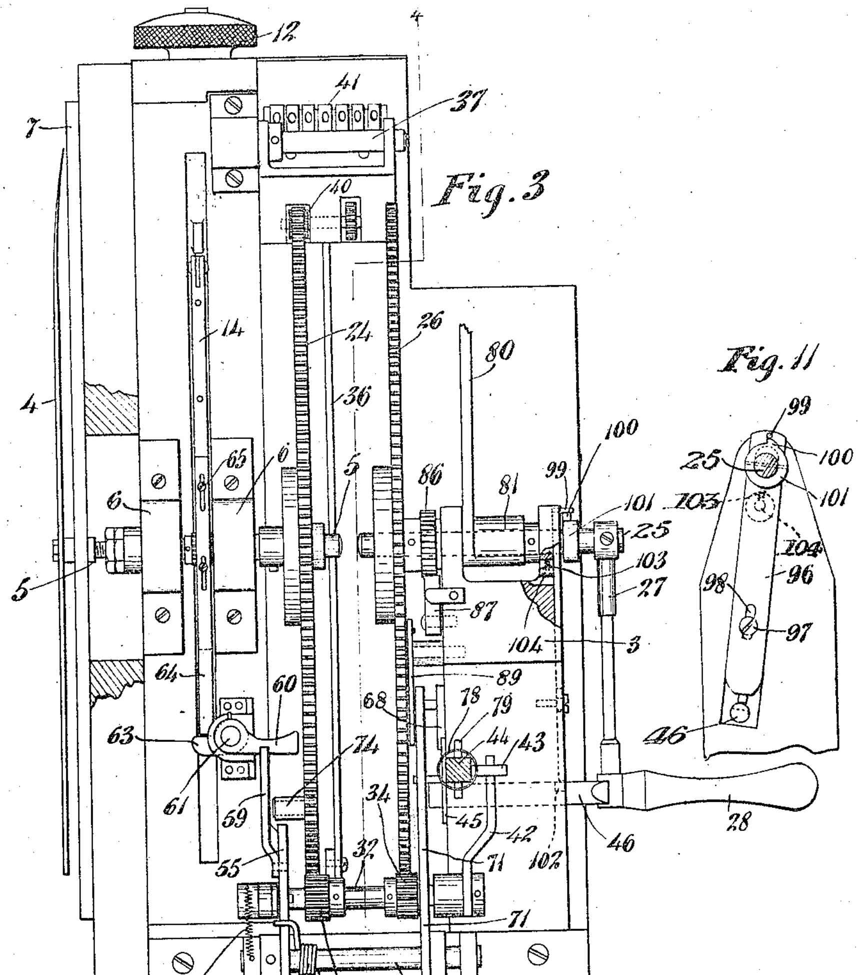
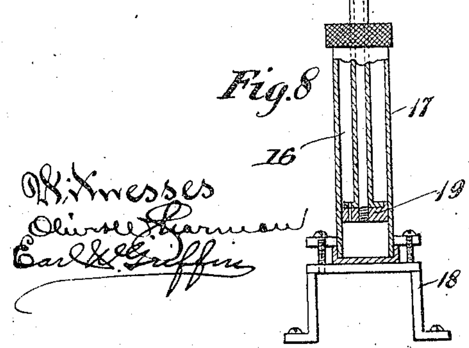
Witnesses
Oliver Harman
Carl H. Griffin
Inventor
William B. Moon
by Alfred M. Allen
Attorney W. B. MOON.
TOTAL ADDING WEIGHING SCALE.
APPLICATION FILED MAY 18, 1911.
1,040,380.
Patented Oct. 8, 1912.
4 SHEETS—SHEET 3.
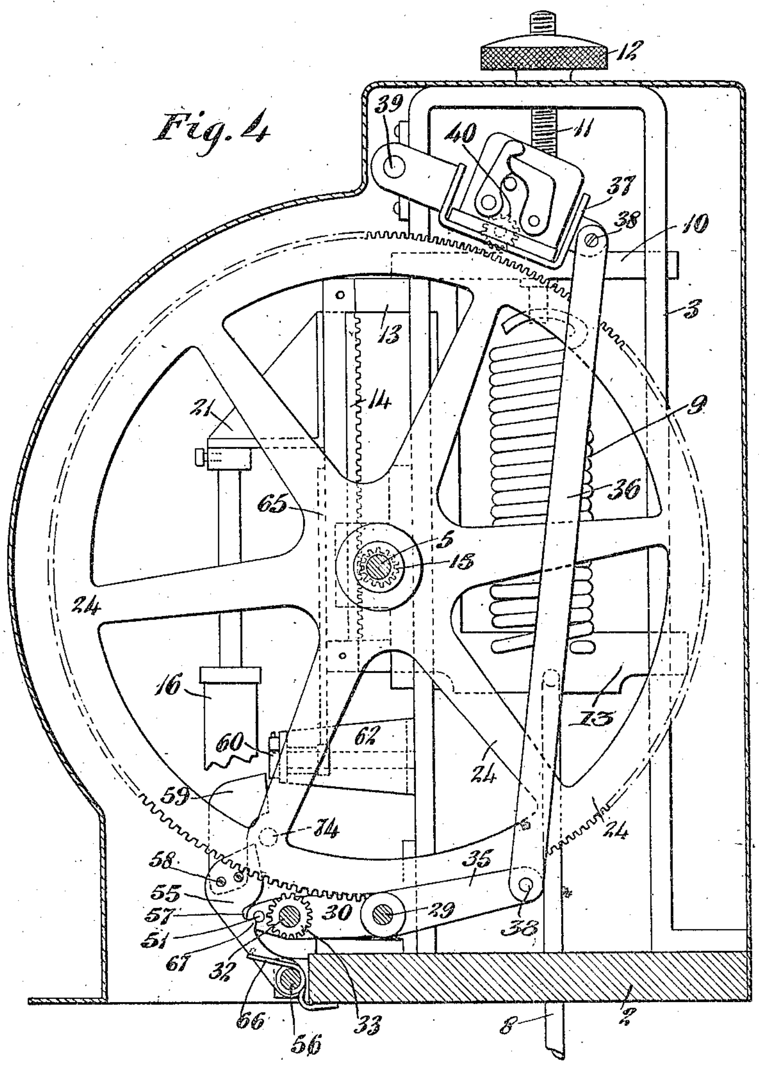
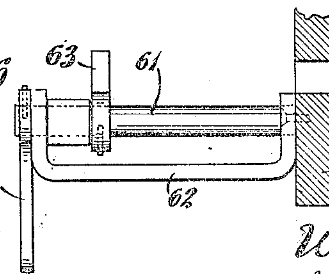
Witnesses
Oliver W. Harman
Earl L. Griffin
Inventor
William B. Moon
by Alfred M. Allen
Attorney W. B. MOON.
TOTAL ADDING WEIGHING SCALE.
APPLICATION FILED MAY 18, 1911.
1,040,380.
Patented Oct. 8, 1912.
4 SHEETS—SHEET 4.
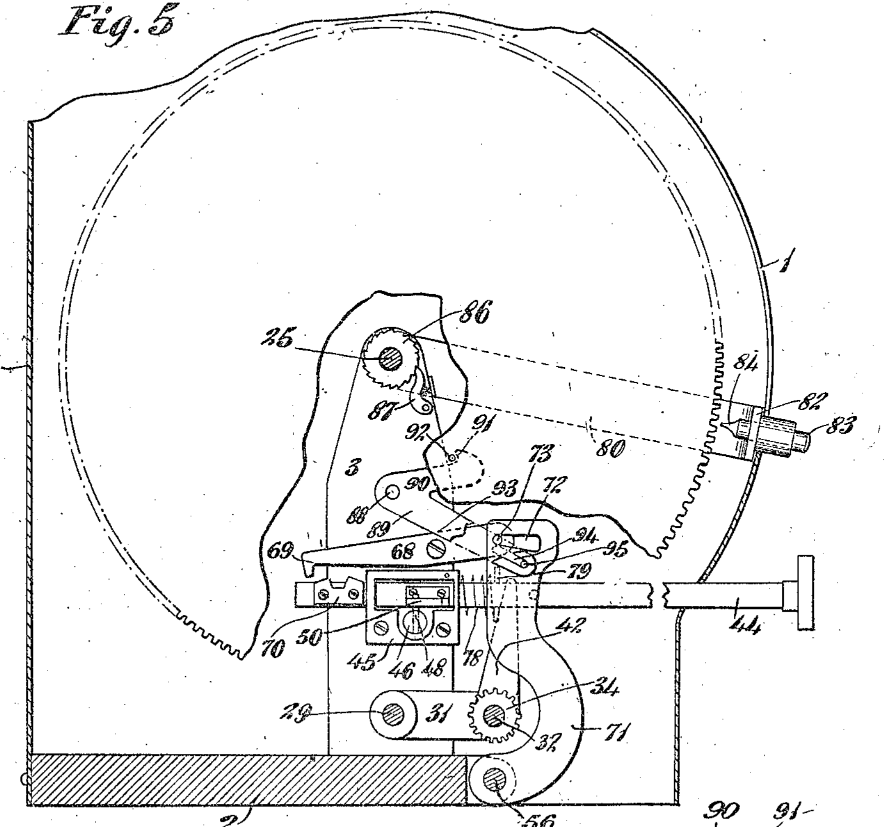
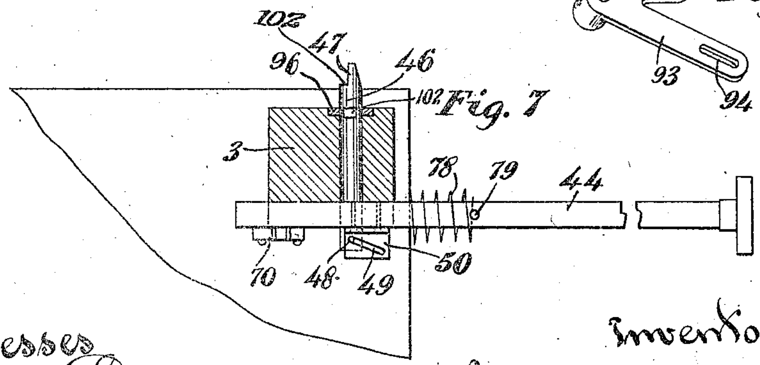
Witnesses
Oliver W. Sherman
Earl M. Griffin
Inventor
William B. Moon
by Alfred M. Allen
Attorney

UNITED STATES PATENT OFFICE.

WILLIAM B. MOON, OF SANDUSKY, OHIO.

TOTAL-ADDING WEIGHING-SCALE.

1,040,380. Specification of Letters Patent. Patented Oct. 8, 1912.

Application filed May 18, 1911. Serial No. 628,000.

*To all whom it may concern:*

Be it known that I, WILLIAM B. MOON, a citizen of the United States, and a resident of the city of Sandusky, in the county of Erie and State of Ohio, have invented certain new and useful Improvements in Total-Adding Weighing-Scales, of which the following is a full, clear, and exact description, reference being had to the accompanying drawings, forming a part of this specification.

My invention relates to attachments for weighing scales, whereby various loads weighed on the scales may be registered on the counting wheels and the totals of the amounts weighed added up, and the especial object of my invention is to improve the construction and operation of such machines of the kind described in my Patent No. 972,394, of October 11, 1910, whereby the clutch mechanism for connecting the operating shafts is dispensed with and the connection of the parts is made positive by intermeshing gear.

Various other features of novelty in the construction and operation will be more particularly pointed out in the progress of the specification.

In the drawings, Figure 1 is a side elevation of my improved machine. Fig. 2 is a rear elevation of the same. Fig. 3 is a side elevation with the casing removed. Fig. 4 is a vertical section, taken on the lines 4, 4, of Fig. 3, looking toward the left. Fig. 5 is a similar section, looking toward the right. Fig. 6 is a plan view of the bracket and rock shaft for unlocking the adding mechanism. Fig. 7 is a plan view of the push rod and pin for releasing the crank. Fig. 8 is a vertical section of the dash-pot for steadying the movement of the dial pointer. Fig. 9 is a transverse section thereof. Fig. 10 is a perspective view of the locking pawl for one of the gears. Fig. 11 is a detail side view of the locking bar for the crank handle pin.

The casing within which the operating parts are inclosed is indicated by 1, and within this casing is secured a base plate 2 and the framework 3 for holding the operating parts.

The weighing scales are of the construction in which the weights are indicated by the movement of a pointer 4, which is secured to a shaft 5, suitably mounted in the casing in ball bearings 6, 6, the weights being indicated by the movement of the pointer over a graduated dial, indicated at 7.

8 is a rod connecting the indicating mechanism with the platform scales, not shown, and the upper end of this rod is coupled with a frame 13 to which is attached a heavy coiled spring 9, under the extension of which the various weights are indicated. The upper end of this coiled spring is connected with a cross bar 10, suitably guided in the frame, and the tension of the spring is regulated by the rod 11 connected therewith, upon the outer end of which is mounted the thumb nut 12.

The sliding frame 13, suitably guided and supported in the framework, carries the rack 14, which engages a pinion 15 on the shaft 5, so that the loads on the platform actuate the rack and pinion to move the pointer over the graduated dial. The nut 12 is employed to balance the scale in the usual way. The adjustment of the nut 12 raises or lowers the rod 11 and through it the frame 13 and rack 14, and thus the pointer is adjusted to the zero position.

In order to steady the movement of the pointer, I provide a dash-pot 16, consisting of the usual closed cylinder 17, supported by standards 18, while in the cylinder is mounted the piston 19 with piston rod 20 connected with the projecting plate 21 on the rack frame 14. The plunger piston is made in two parts, with slots 22 registering with each other for the passage of the retarding medium in the cylinder, and one of the parts is mounted on a solid rod which is located inside the hollow rod of the other part, so that one portion of the piston can be rotated and the other held in any desired position by the set screw 23 to regulate the extent of the slotted opening in the piston, and thus to regulate the action of the dash-pot.

The shaft 5 on its inner end carries the large gear wheel 24 secured thereon, which gear rotates with the pointer 4, and when the weighing scales are used without reference to the adding devices, this gear rotates without function.

The parts above described form an ordinary weighing scale's construction; and as described, the scales can be used in the ordinary way.

Mounted in line with the shaft 5 is a second shaft 25. This shaft is supported in suitable bearings in the framework and carries on its inner end, keyed thereto, an enlarged driving gear 26 of the same size and number of teeth as the gear 24. The shaft 25 on its outer end carries the crank 27, with its handle 28, by means of which the shaft 25 and gear 26 may be rotated. Suitably pivoted in the lower portion of the frame is a rock shaft 29, upon which are secured side arms 30, 31, extending horizontally and parallel to each other, and in the outer end of these arms is mounted the shaft 32 upon which are secured a pair of similar pinions 33, 34, which pinions are arranged to engage respectively the gears 24 and 26. Secured also on the shaft 29 and extending in the opposite direction is an arm 35, which is connected at 38 by connecting bar 36 with the outer end of a casing 37, which is in turn pivotally mounted at 39 in the framework of the machine. This casing 37 carries the counting wheels 41 of a total adding mechanism, which is actuated by a pinion 40, mounted in the casing. This pinion is arranged to engage the large gear 24 mounted on the shaft 5. The pinions 33, 34, and the pinion 40 of the registering mechanism are normally separate from and out of engagement with their respective gears 24 and 26. It will be evident, however, that by rocking the shaft 29 the pinions 33 and 34 on the shaft 32 and the pinion 40 on the register casing will each be thrown into mesh with their respective gears, so that the rotation of the gear 26 by the crank handle 28 will, through the intermeshing pinions 33 and 34, rotate the gear 24, which rotation will in turn register its movement on the counting wheels. In order to effect this movement, an arm 42 is rigidly fixed to the arm 31 of the pinion frame, which arm projects upwardly into the pathway of a horizontal pin 43 on the push rod 44 which is mounted in the frame to slide inwardly, and is held in position on the frame by the plate 45 secured over the horizontal slot in the framework in which the rod slides. As the arm 42 is fixed to the arm 31, this inner movement of the push rod rocks the pinion carrying frame and rock shaft 29 to throw the pinions 33, 34, into mesh with their respective gears. At the same time the rocking of the shaft 29 through the arm 35 and connecting bar 36 draws down the register casing and brings the pinion 40 into mesh with the gear 24.

The crank handle 28 is normally prevented from being rotated by the pin 46, against which the lower end of the crank abuts at 47. This pin slides loosely in an opening through the framework 3, and on its inner end carries an upwardly projecting pin 48 which engages in a diagonal slot 49 in a lateral plate 50, which is secured to the side of the push rod 44, so that as the push rod is actuated the pin 46 will be withdrawn from the pathway of the crank handle.

In order to lock the pinion frame and pinions 33 and 34 in their engaging position with their respective gears, the outer end of the pinion frame is provided with a pin 51 projecting upwardly with the shaft 32 at the end opposite the arm 42, which pin projects into the pathway of a pawl 55 fixed on rock shaft 56, journaled at the bottom of the frame. This pawl is provided with a notch 57 to engage the pin 51 and hold the pinions in mesh when a weight has been placed on the scales. Before the scales are actuated, however, this pawl is prevented from engaging the pin 51. Secured on the end of the pawl, preferably by screws 58, is a dog 59 which projects upwardly to engage a horizontal arm 60, which is secured to a short shaft 61, mounted in a bracket 62 secured to the framework (see Fig. 6). This shaft 61 also carries a short arm 63, projecting in the opposite direction and directly underneath a downwardly extending bar 64, which is secured adjustably by pin and slot connection 65 to the sliding rack bar 14. The bar is made adjustable in order to be properly adjusted with reference to the arm 63, after the nut 12 has adjusted the pointer to zero, as hereinbefore described.

It will be evident from this construction that when the rack bar 14 is in its upper position without any load upon the scales, the projecting arm 60 will stand in the pathway of the dog 59, and thus prevent the pawl 55, which is spring-pressed inwardly by the coiled spring 66 from engaging the pin 51. The moment any load is placed on the scales and the sliding frame 13 with its downwardly extending bar 64 is actuated, the shaft 61 will be rocked, raising the arm 60 and releasing the dog and pawl. When a weight, therefore, has been placed on the scales and the push rod 44 is actuated to rock the pinion frame, the pin 51 will be raised and the pawl will engage the pin and hold the pinions in mesh. In the event that the push rod 44 is not actuated, however, to raise the frame, the use of the scales to weigh articles, the weights of which are not to be registered, the pawl 55 does not operate when released by reason of the projection 67 engaging the pin 51.

In order to hold the push rod 44 in its inner position, I provide a latch 68 which is pivoted to the frame 3 above the push rod, and the end 69 of this latch 68 engages in the recessed block 70 secured on the inner end of the push rod 44. This engagement of the latch 68 with the push rod, however, is not permitted until a weight is placed on the scales and the pawl 55 allowed to engage the pinion frame to hold the pinions in mesh. The movement of the pawl 55 when released rocks the shaft 56 upon which it is mounted, and this in turn rocks the arm 71 secured at the other end of this shaft. The upper end of this arm 71 is provided with a cam slot 72, which is engaged by a pin 73 on the inner end of the latch 68. The lower surface of the cam slot is formed on the arc of a circle concentric with the axis of the rock shaft 56, while the upper edge of this slot is tangential of said arc. This makes the slot wider at one end than at the other, and as the push rod is actuated, it permits the latch 68 to drop down into the notch in the block 70 of the push rod, when the shaft 32 is locked, as heretofore described. In this way, the parts are all locked in operative position when the push rod is actuated and a weight has been placed on the scales. When it is desired, therefore, to register the weight of any load, while the weight is on the scales and the pointer 4 has moved to indicate on the dial the weight, the push rod is actuated and the pinions connecting the two gears 24 and 26 are locked in mesh. At the same time the pinion 40 of the registering device is brought into engagement with the gear 24, the pin 46 is withdrawn from the pathway of the crank handle and the crank is turned in the direction of the arrow in Fig. 2 to rotate the gears and bring the pointer 4 back to zero, thus registering the amount of the weight on the counting wheels in the register device. During this movement of the operating handle, the pinion 15 is also actuated to raise the rack bar 14 and with it the weight on the scale; but this is immaterial. In order that the pinions may be thrown out of mesh, however, as soon as the zero point is reached, and at the same time to permit the crank handle to be returned to its normal position, I provide a pin 74 which projects laterally from the side of the gear 24, and this pin is so located on this gear that it will come into engagement with the pawl 55 at the zero point. The pawl 55 is therefore thrown out of engagement with the pin 51 on the pinion frame, and the weight of the frame, assisted by the coiled spring 75 attached between the pinion frame and the base plate of the casing rocks the frame and throws both the pinions 33 and 34 and the counter pinion 40 out of mesh with the gears. At the same time the rocking of the shaft 56 causes the cam surface of the cam slot 72 in the arm 71 to engage the pin 73 on the latch 68 and throw the latch out of engagement with the push rod, when it is at once thrown back into its normal position by the coiled spring 78 bearing between the frame 3 and the pin 79 on the push rod.

It frequently happens that it is desirable to obtain the net weight, instead of the gross weight, and in order to provide for deducting the weight of the container of the article weighed, I mount an arm 80 with its hub 81 loosely on the shaft 25 and the outer end of this arm is provided with a lateral flange 82 in which is mounted a spring pin 83, in proper position for the beveled end of the pin 84 to engage the teeth of the gear 24. With this construction, before pressing the push rod 44 to engage the pinions, in order to add on counting wheels only the net weight, the pin 83 is pushed in to engage the gear 24, and the gear and pointer are turned back the number of graduations 114 in the casing indicated by the pointer 85, to correspond to the weight of the container. The gear and pointer having been turned back, it is necessary for the operator to hold the pin 84 in engagement with the teeth of the gear 24 until the push rod 44 is pressed in. When the push rod is actuated, however, the tare-deducting device can be released because the two gears 24, 25, will then be coupled together, and the ratchet and pawl 86, 87, will prevent any back movement of the shafts. When the push rod has been pressed in, the handle will then be given one full revolution, which adds the exact weight only on the counting wheels.

In order to prevent any back movement of the shaft 25, after the gears are connected I mount a ratchet wheel 86 on the shaft and provide a spring-pressed pawl 87 to engage the teeth of the ratchet.

In order to prevent any one from operating the crank handle when there is no weight on the scales, I pivot on a stud 88 projecting from the face of the standard support of the shaft 25, a locking pawl 89. This pawl is formed with an arm 90, provided with a hook 91 which engages when in normal position a pin 92 projecting from the face of the gear 26. The pawl is also provided with the slotted arm 93, the slot 94 in which engages a pin 95 projecting from the face of the arm 71. Inasmuch as the arm 71 is prevented from rocking by the engagement of the dog 59 with the horizontal arm 60 on the rock shaft 61, when the platform scales are in their normal position without any weight thereon, it will be evident that the gear 26, shaft 25 and the crank handle 28 cannot be actuated until the lever 71 is released, which can only take place when a weight has been placed upon the scale. This prevents any improper turning of the crank handle.

In order to prevent the operation of the push rod 44 more than once for each revolution of the crank, I provide a locking bar 96 to engage the pin 46. This locking bar 96 is inset in the face of the standard 3, with its lower end immediately over the crank handle pin 46. The locking bar is guided on the stud 97, engaging in the slot 98 in the bar, and the upper end of the bar 96 has slotted engagement over the shaft 25, and on its projecting end carries the pin 99, which is engaged by the cam 100 on the collar 101, pinned to the shaft 25. This cam is so arranged that when the shaft 25 and crank handle are in their normal positions, the locking bar 96 will be raised by the cam out of engagement with the pin 46. The pin 46, however, is provided with a notch 102. When the pin is released and the crank turned, the cam is withdrawn from under the pin 99 on the locking bar, and a spring 103 mounted in a recess in the face of the standard and bearing on an inwardly projecting stud 104 on the locking bar, presses the locking bar downwardly, so that the moment the pin 46 is released by the return of the dial pointer and its operating mechanism to zero, the pin 46 returns to its normal position, and the locking bar 96 engages in the notch in the pin, thus locking the pin and preventing any further movement of the push rod until the crank handle has been given a full revolution to cam the locking bar 96 out of engagement with the pin 46.

It is thought that from the foregoing description the operation of the apparatus will be sufficiently clear. Articles are automatically weighed on the scales in the usual way, when it is not desired to register the weights on the counting wheels, as the weighing devices are entirely independent of the tare deducting and total adding mechanism. When any goods are weighed concerning which it is desired to keep a record,—when the goods are placed on the scales, the rod 44 is pushed in, the locking pawl for the pinion frame is released and the pinions and shaft lock the gears 24 and 26 together with the total adding pinion wheel 40 in mesh with the gear 24. In the event that net weight only is to be registered, before the push rod is actuated, the amount of the container which has been before that time ascertained, is deducted by actuating the arm 80. Then the latch 46 being removed from the pathway of the crank handle the handle is rotated to turn back the dial pointer to zero and register the weight on the counting wheels. As soon as the zero point is reached, the pin 74 throws out the locking pawl, the pinions are disconnected and the handle can be carried around to its normal position without further registration. To prevent any unauthorized person from turning the crank when no weight is to be recorded, the crank, as heretofore described, is normally locked from being turned by the locking pawl in engagement with the gear 26. Moreover, to compel the proper and normal operation of the crank handle, one complete rotation for each article weighed, I provide, as above described, for locking the pin 46, so that the push rod cannot be operated, and the gears and pinions thrown into mesh except once for each rotation of the crank handle. It will also be noticed that the tare deducting device is independent of the total adding mechanism, so that it can be used whenever desired, and its use avoids the necessity of setting down the gross weight and deducting the tare, as is usual with ordinary scales. The article is placed on the scales and then the pointer 85 operated to deduct the tare. This movement also turns back the indicating pointer 4 the number of pounds to be deducted so that the operator obtains the net weight directly from the dial without the necessity of any calculation.

Having thus described my invention, what I claim as new and desire to secure by Letters Patent, is:—

1. In a device of the character specified, the combination with the weight indicating mechanism, of a supplemental re-setting mechanism normally inactive, means for positively coupling the supplemental re-setting mechanism to the weight indicating mechanism when desired, a counting device and mechanism for actuating same, and means for connecting the counter actuating means with the weight indicating mechanism for indicating the amounts weighed when using the supplemental re-setting mechanism, with means for automatically releasing the re-setting mechanism when the weight indicating mechanism is reset.

2. In a device of the character specified, the combination with the pointer actuating mechanism, of a supplemental shaft normally inactive, means for positively coupling said shaft to the pointer actuating mechanism to reset the pointer to zero, when desired, a counting device with mechanism for actuating same, means for connecting the counter actuating mechanism with the pointer actuating means, for indicating the return movement of the pointer, with means for automatically uncoupling the shaft and pointer when the pointer is reset to zero.

3. In a device of the character specified, the combination with a shaft carrying a pointer, of a supplemental shaft normally inactive, with means for positively coupling the two shafts to reset the pointer shaft to zero, a counting device with mechanism for actuating the same, and means for connecting the counter actuating means with the pointer shaft, to indicate the movement thereof, with means for automatically uncoupling the two shafts when the pointer shaft is reset.

4. In a device of the character specified, the combination with a shaft carrying a pointer, of a supplemental shaft normally inactive, with means for positively coupling the two shafts to reset the pointer to zero when desired, a counting device with a pinion for actuating same, and a gear secured on the pointer shaft normally out of engagement with the counter pinion, and means for bringing said gear and pinion into engagement with the coupling together of the pointer and supplemental shaft, with means for automatically uncoupling the two shafts when the pointer is reset to zero.

5. In a device of the character specified, the combination with a shaft carrying a pointer, of a supplemental shaft normally inactive, with means for positively coupling the two shafts to reset the pointer to zero when desired, a counting device with a pinion for actuating same, and a gear secured on the pointer shaft normally out of engagement with the counter pinion, a connecting bar intermediate the counting mechanism and the shaft coupling means, whereby the coupling of the two shafts will force the counter pinion into engagement with the gear.

6. In a device of the character specified, the combination of a shaft carrying a pointer, a supplemental shaft, a gear keyed to each shaft, a rock frame carrying pinions rotatable in unison, one for each gear, and normally disconnected therefrom, with means for rocking said frame to positively couple said shafts to reset the pointer shaft to zero by the rotation of the supplemental shaft.

7. In a device of the character specified, the combination of a shaft carrying a pointer, a supplemental shaft, a gear keyed to each shaft, a rock frame carrying pinions rotatable in unison, one for each gear, and normally disconnected therefrom, a movable counting mechanism with pinion for actuating same, a bar connecting said counting mechanism with said rock frame, with means for rocking said frame to positively couple said shaft and the pinion of the counting mechanism to reset the pointer shaft to zero with the rotation of the supplemental shaft, and to indicate the amount reset on the counting mechanism.

8. In a device of the character specified, the combination of a shaft carrying a pointer, a supplemental shaft, a gear keyed to each shaft, a rock frame carrying pinions rotatable in unison, one for each gear, and normally disconnected therefrom, with means for rocking said frame to positively couple said shafts to reset the pointer shaft to zero by the rotation of the supplemental shaft, with means for automatically disconnecting said pinion and gears when the pointer is reset.

9. In a device of the character specified, the combination of a shaft carrying a pointer, a supplemental shaft, a gear keyed to each shaft, a rock frame carrying pinions rotatable in unison, one for each gear, and normally disconnected therefrom, with means for rocking said frame to positively couple said shafts and a pawl for locking said gears in engagement, with a pin on the pointer shaft gear to disengage said pawl when the pointer is reset to zero.

10. In a device of the character specified, the combination of a shaft carrying a pointer, a supplemental shaft, a gear keyed to each shaft, a rock frame carrying pinions rotatable in unison, one for each gear, and normally disconnected therefrom, a movable counting mechanism with pinion for actuating same, a bar connecting said counting mechanism with said rock frame, with means for rocking said frame to positively couple said shafts and the pinion of the counting mechanism to reset the pointer shaft to zero with the rotation of the supplemental shaft, and to indicate the amount reset on the counting mechanism, and a pawl for locking the said gears in engagement, and a pin on the pointer shaft gear to disengage said pawl and disconnect the pinions when the pointer is reset.

11. In a device of the character specified, the combination of a shaft carrying a pointer, a supplemental shaft, a gear keyed to each shaft, a rock frame carrying pinions rotatable in unison, one for each gear, and normally disconnected therefrom, with means for rocking said frame to positively couple said shafts, means for locking said gears in engagement, and connecting mechanism with the pointer shaft to lock said means out of operation until the pointer shaft is actuated.

12. In a device of the character specified, the combination of a shaft carrying a pointer, a supplemental shaft, a gear keyed to each shaft, a rock frame carrying pinions rotatable in unison, one for each gear, and normally disconnected therefrom, with means for rocking said frame to positively couple said shafts, a pawl for locking said gears in engagement, with connecting mechanism intermediate said pawl and the pointer shaft to lock the pawl out of engagement until the pointer shaft is actuated.

13. In a device of the character specified, the combination of a shaft carrying a pointer, a supplemental shaft, a gear keyed to each shaft, a rock frame carrying pinions rotatable in unison, one for each gear, and normally disconnected therefrom, with means for rocking said frame to positively couple said shafts, with means for locking said gears in engagement, and connecting mechanism with the pointer shaft to lock said means out of operation until the pointer shaft is actuated, a locking pawl to lock the supplemental shaft from movement, and connection therefor with the gear locking means to prevent operation of the supplemental shaft until the gear locking means is released.

14. In a device of the character specified, the combination of a shaft carrying a pointer, a supplemental shaft, a gear keyed to each shaft, a rock frame carrying pinions rotatable in unison, one for each gear, and normally disconnected therefrom, with means for locking said gears in engagement, with connecting mechanism intermediate said pawl and the pointer shaft to lock the pawl out of engagement until the pointer shaft is actuated, a locking pawl to lock the supplemental shaft from movement, and connection therefor with the gear locking pawl to prevent the operation of the supplemental shaft until the gear locking pawl is released.

15. In a device of the character specified, the combination of a shaft carrying a pointer, a supplemental shaft, a gear keyed to each shaft, a rock frame carrying pinions rotatable in unison, one for each gear, and normally disconnected therefrom, with means for rocking said frame to positively couple said shafts, a crank for rotating the supplemental shaft, with a pin to block the movement of the crank and connecting mechanism with the frame locking means to release said pin upon the actuation of the rocking frame.

16. In a device of the character specified, the combination of a shaft carrying a pointer, a supplemental shaft, a gear keyed to each shaft, a rock frame carrying pinions rotatable in unison, one for each gear, and normally disconnected therefrom, with means for rocking said frame to positively couple said shafts, a crank for rotating the supplemental shaft, with pin to block the movement of the crank, and connecting mechanism with the frame locking means to release said pin upon the actuation of the rocking frame, a locking bar to engage the pin, and cam on the supplemental shaft to hold said locking bar out of engagement when the crank is in its normal position.

WILLIAM B. MOON.

Attest:

PHILIP BUERKLE,

AL. C. LEHMANN.